(12) United States Patent
Semrau et al.

(10) Patent No.: US 9,230,748 B1
(45) Date of Patent: Jan. 5, 2016

(54) HYBRID ENERGY STORAGE MODULE

(71) Applicant: Moog Inc., East Aurora, NY (US)

(72) Inventors: Greg Semrau, Amherst, NY (US); Christopher Strong, East Aurora, NY (US); David Barus, East Aurora, NY (US); Frank DeReu, East Aurora, NY (US); Darren George, East Aurora, NY (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 14/151,793

(22) Filed: Jan. 9, 2014

(51) Int. Cl.
*H01M 10/46* (2006.01)
*H01G 11/08* (2013.01)
*H01G 11/10* (2013.01)

(52) U.S. Cl.
CPC .............. *H01G 11/08* (2013.01); *H01G 11/10* (2013.01)

(58) Field of Classification Search
CPC ....... H02J 7/0068; H02J 7/0054; H02J 7/007; H02J 7/0013; H02J 7/0019
USPC .......................... 320/103, 107, 115, 166, 112
See application file for complete search history.

(56) References Cited

U.S. PATENT DOCUMENTS

| | | | |
|---|---|---|---|
| 4,774,649 A * | 9/1988 | Archer | H02M 3/33538 323/247 |
| 5,563,479 A | 10/1996 | Suzuki | |
| 6,087,812 A | 7/2000 | Thomas et al. | |
| 7,170,260 B2 | 1/2007 | Thrap | |
| 7,345,454 B2 | 3/2008 | Thrap | |
| 2011/0267161 A1* | 11/2011 | MacLennan | H01F 27/105 336/58 |
| 2012/0089286 A1 | 4/2012 | Nakata | |
| 2012/0139487 A1 | 6/2012 | Kim et al. | |
| 2012/0319471 A1 | 12/2012 | Miller | |

* cited by examiner

*Primary Examiner* — Edward Tso
(74) *Attorney, Agent, or Firm* — Hodgson Russ LLP

(57) ABSTRACT

The present disclosure is directed to an energy storage system using a combination of battery and ultra-capacitor storage components and having passive voltage control. An inductor is placed inline between the batteries and ultra-capacitors of the hybrid module. In another embodiment, the inductor/ultra-capacitor module is configured to be connected to a battery. The disclosed device is suitable for use in high-power applications where high-currents can have adverse effects on impedance-matching components.

17 Claims, 15 Drawing Sheets

(8 of 15 Drawing Sheet(s) Filed in Color)

HYBRID ENERGY STORAGE MODULE

FIELD OF THE INVENTION

The present disclosure relates to energy storage systems, and more particularly to energy storage systems for high-voltage applications.

BACKGROUND OF THE INVENTION

Batteries are energy storage devices that are well-known for use as an autonomous supply of energy for a desired application through a chemical reaction. Batteries are an energy dense technology (kWh/kg). Ultra-capacitors are increasingly used for supplying energy. Ultra-capacitors are designed to be very power dense (kW/kg) and are capable of delivering very high instantaneous current. Ultra-capacitors have a very simple construction when compared to batteries which leads to lower cost per unit of energy. Ultra-capacitors have an order of magnitude reduced internal resistance compared to batteries.

Hybrid energy storage systems using, for example, batteries and ultra-capacitors have been developed in order to take advantage of the strengths of each technology to provide high power density solutions. Such hybrids can be better optimized when compared to a single energy storage technology, like adding batteries in parallel to achieve peak power points of particular applications. The outcome of the combined design is that the total weight, volume and cost can be reduced over battery-only designs. In such previous hybrid energy storage systems, voltage control between the battery and ultra-capacitor sub-systems has been by active circuits (see FIG. 9A). Such previous designs commonly use a bi-directional DC/DC converter or an active current management control strategy.

The active controllers used in such hybrid energy storage systems add to the weight and complexity of the overall system. Additionally, the controllers are susceptible to electrical design risks common in space/aerospace applications.

BRIEF SUMMARY OF THE INVENTION

The present disclosure is directed to an energy storage device using a combination of battery and ultra-capacitor storage components and having passive voltage control. An inductor is placed inline between the batteries and ultra-capacitors of the hybrid module. The disclosed device is suitable for use in high-power applications where high-currents can have adverse effects on impedance-matching components—i.e., causing saturation in inductors. Additionally, inductors of some embodiments of the present invention are designed to better dissipate heat generated in such high-power applications.

The present passive hybridization technique differs from previous systems in that there is no need for complicated electronics to regulate system voltage, thereby reducing the electrical design risk and other environmental risks inherent when using active electronics. As such, the use of passive voltage control allows the hybrid systems to be used in applications—in particular, space, aerospace, defense, and industrial applications—in which electronics are restricted through specification, environment, or end use. Systems according to embodiments of the present disclosure advantageously have lower complexity, for example, eliminating the need for a DC/DC converter. And, such passively-controlled systems benefit from lower-weight than the conventional alternatives. Passive voltage control is also more reliable than active voltage control because of the reduction in active electronics, which is advantageous for space and aerospace applications.

The application space is a primary driver in systems according to the present disclosure. In applications with harsh environments, solutions are difficult to design and have often have additional restrictions such as, for example, common design practices, required to meet military standards and avoid electrical design risks. Systems according to the present disclosure are particularly suited for applications such as, for example, sub-sea vehicles, unmanned aerial vehicles, aerospace systems, deep space systems, military vehicles and turret drive systems, and industrial systems. The high current demand nature of these applications necessitates more than common commercial electrical design practices and component selection.

Compared to battery-only solutions, (see FIG. 10), hybrid systems allow for more optimal sizing of the energy module to the duty cycle (the power requirements of a load over time). It can be seen that while both systems come close to maximizing the capability of the respective modules in maximum power draw, the hybrid system can be better optimized to the duty cycle for energy. The difference between the two systems in performance is that the ultra-capacitor takes a significant portion of power load on high current transients in the hybrid module. Additionally, the battery-only solution will be oversized in energy because it is sized to peak current. As such, hybrid modules save in both cost and weight when compared to battery-only options.

DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and objects of the invention, reference should be made to the following detailed description taken in conjunction with the accompanying drawings, in which.

DETAILED DESCRIPTION OF THE INVENTION

Figure 1:
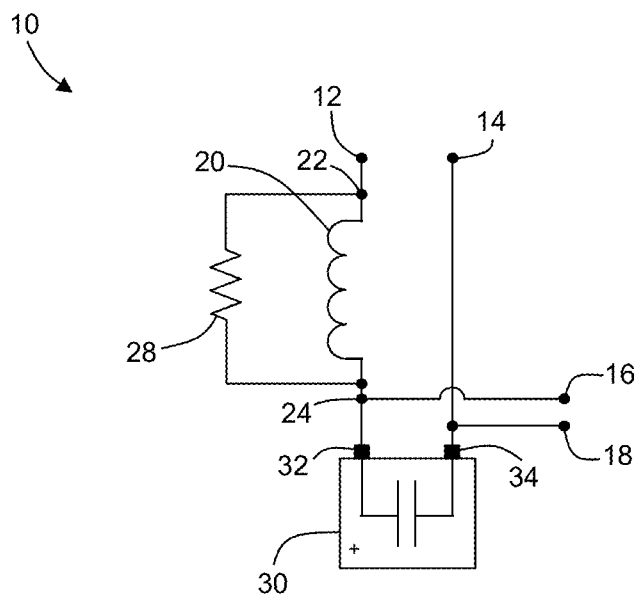
FIG. 1 is a circuit diagram of an ultra-capacitor module according to an embodiment of the present disclosure.

With reference to FIG. 1, the present disclosure may be embodied as an ultra-capacitor module 10 for an energy storage apparatus. Such a module 10 may be used to supplement an existing battery-only system. The ultra-capacitor module 10 comprises a battery positive terminal 12 configured to be connected to a positive terminal of a rechargeable battery and a battery negative terminal 14 configured to be connected to a negative terminal of the rechargeable battery. The ultra-capacitor module 10 further comprises a load positive terminal 16 and a load negative terminal 18, configured such that a load connected to the load terminals 16, 18 is electrically in parallel with the at least one ultra-capacitor 30.

The module 10 comprises an inductor 20 having a first lead 22, a second lead 24, and a core made from a low-permeability material (further described below). The first lead 22 of the inductor 20 is in electrical communication with the battery positive terminal 12. At least one ultra-capacitor 30 is provided. The at least one ultra-capacitor 30 has a positive lead 32 and a negative lead 34. The positive lead 32 is in electrical communication with the second lead 24 of the inductor 20, and the negative lead 34 being in electrical communication with the battery negative terminal 14.

To handle high power applications the inductor 20 is designed not to succumb to saturation, which typical inductors (i.e., ferromagnetic-core inductors) are susceptible to. A saturated inductor will not properly regulate the balance of current between the two energy sources—ultra-capacitor and battery—and, therefore, will not be suitable for the passive hybrid control design of the present disclosure. Inductors 20 of the present disclosure are designed with the goal of reducing or eliminating the susceptibility to saturation by using low-permeability materials for the inductor 20 core (sometimes referred to as "air-core" inductors). Suitable low-permeability materials may have a permeability of approximately $1.2367 \times 10^{-6}$ (H/m). For example, suitable materials include, without limitation, steel, aluminum, and platinum. Other materials will be apparent to those having skill in the art, in light of the present disclosure. In some embodiments, the core material is also selected to have high thermal conductivity in order to dissipate thermal concerns driven by the high currents of high-power applications. This allows the present inductor 20 to survive a high-power environment and maintain functionality. Such low permeability-core inductors would not be used in more common low-power applications due to the additional size and cost of the low permeability-core inductors compared to ferromagnetic-core inductors.

In some embodiments of an ultra-capacitor module 10, the low permeability-core inductor 20 further comprises one or more thermal pads disposed between the high thermal conductivity material core and the windings of the inductor 20 to aid in heat transfer. Because of the high-power application, the generalized material selection guideline developed for the inductor 20 advantageously accounts for thermal issues that are present in such high-power applications. Thermal heating is present primarily due to the large currents (e.g., in excess of 100 A) that are passed through the inductor. The inductor 20 is designed to reduce the line resistance of the component to assist with lower heating but is not enough to eliminate the issue. The material used for the inductor 20 may be selected to have high thermal conductivity such that thermal heating may be mitigated within the design of the inductor 20. The inductor 20 may be thermally sunk to the packaging of the ultra-capacitor module 10 through thermal pads on the core, sink, and plate. Sinking the generated heat helps reduce the necessary wire gauge of the inductor 20 coil and overall size and weight of the inductor 20. Such reduction in volume and weight is advantageous in the aerospace industry and other industries due to volume and weight restrictions and also reduces any additional volume and weight required by systems of the present disclosure when compared to single energy storage cell designs.

Figure 8:
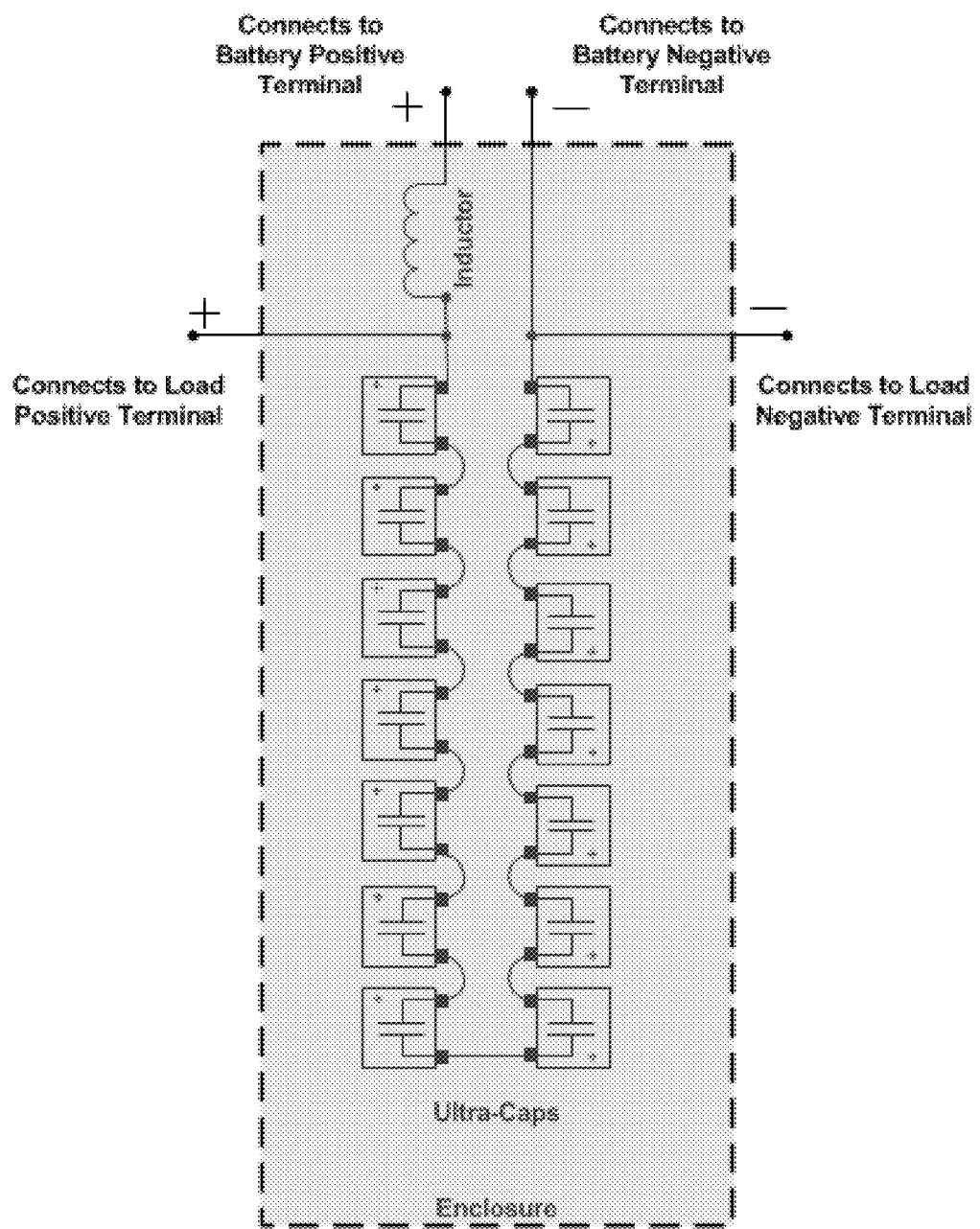
FIG. 8 is a circuit diagram of another embodiment of an ultra-capacitor module according to the present disclosure.
Figure 9A:
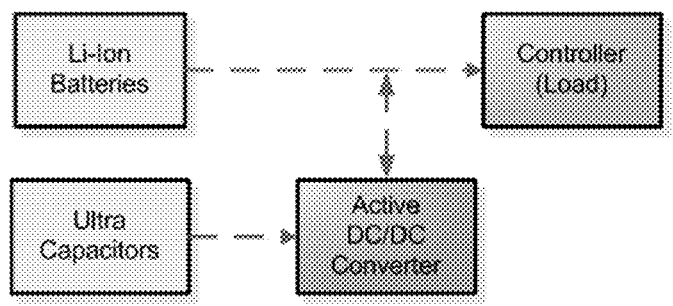
FIG. 9A is a diagram of an active hybridization system according to embodiments of the present disclosure.
Figure 9B:
FIG. 9B is a diagram of a passive hybridization system according to embodiments of the present disclosure.
Figure 9C:
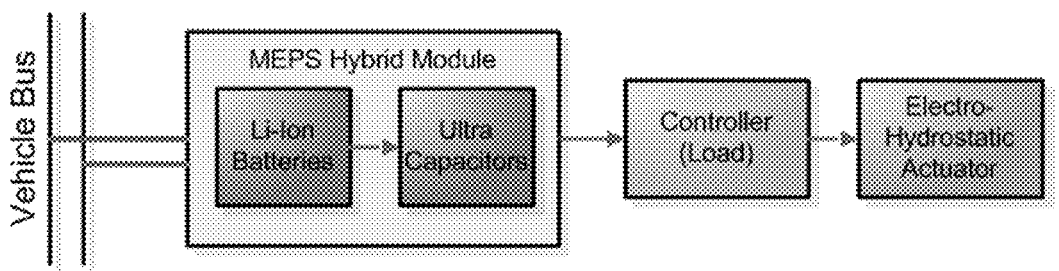
FIG. 9C is a diagram of a passive hybridization system according to another embodiment of the present disclosure.
Figure 10:
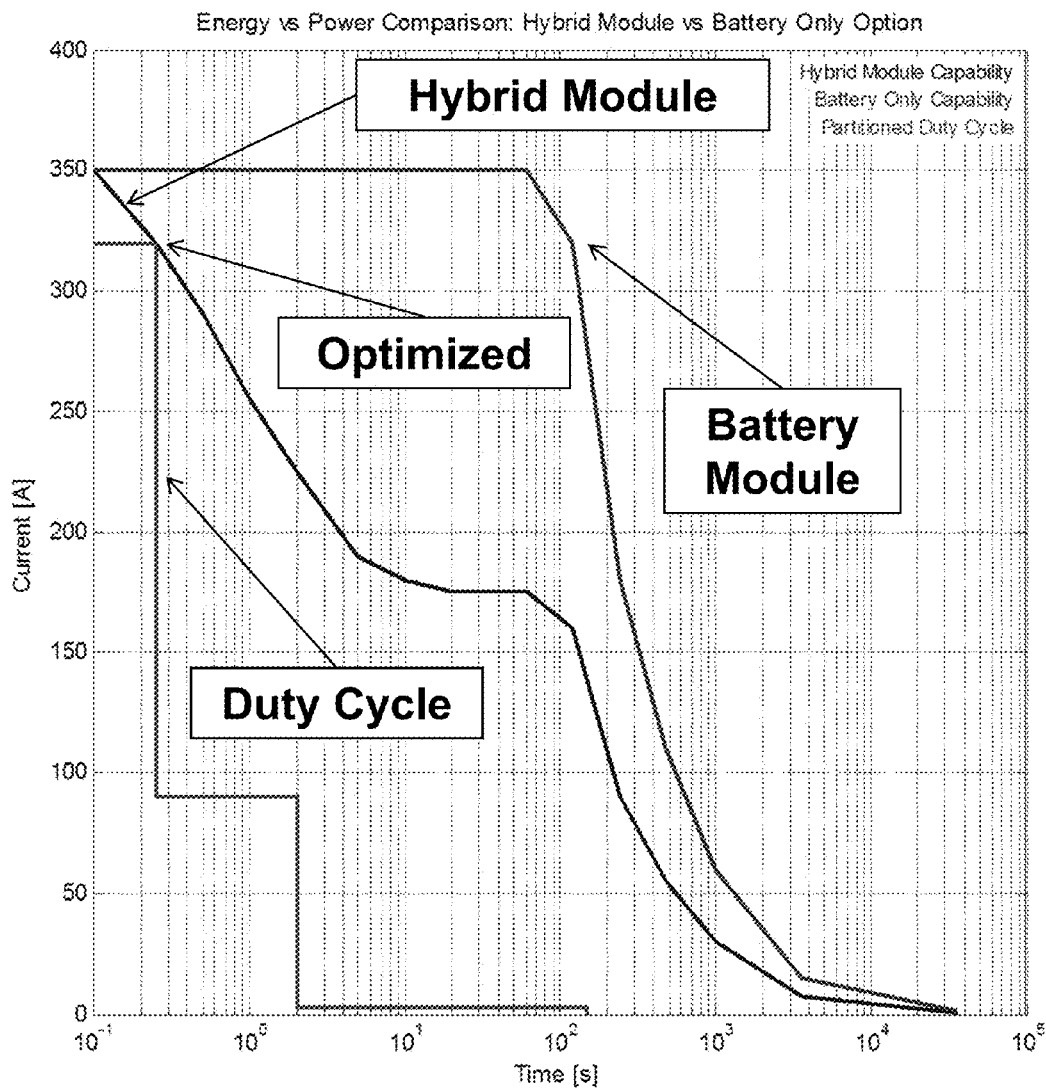
FIG. 10 is a graph depicting the improved sizing (i.e., sized to the duty cycle of a load) of a hybrid module as compared to a battery-only module.
Figure 11A:
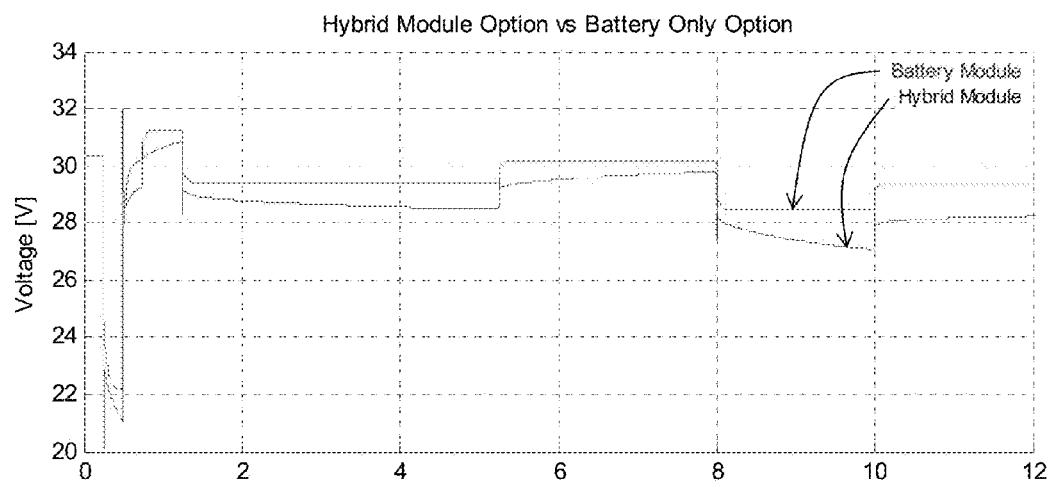
FIGS. 11A and 11B are graphs showing the performance of an embodiment of a hybrid module according to the present disclosure, compared to a battery-only system.
Figure 11B:
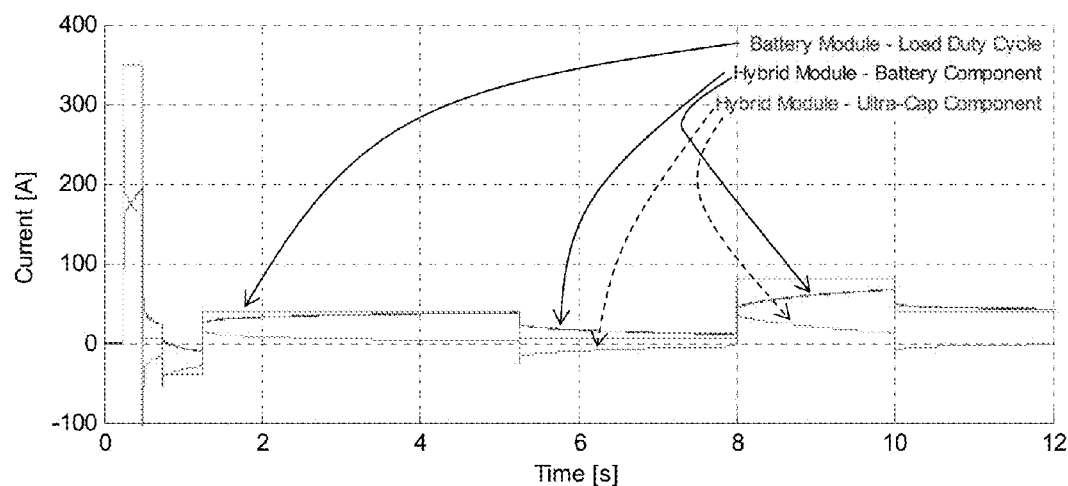

Embodiments may have more than one ultra-capacitor 30 arranged in series to accommodate total higher voltage across the series components, and/or arranged in parallel, to provide higher total capacitance. For example, FIG. 8 depicts an exemplary embodiment of an ultra-capacitor module 10 having fourteen ultra-capacitors 30 arranged in series.

Figure 2:
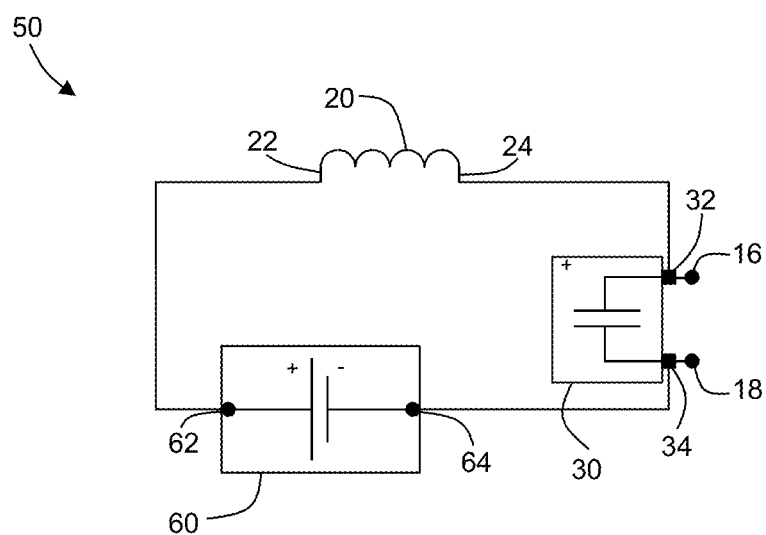
FIG. 2 is a circuit diagram of an energy storage apparatus according to another embodiment of the present disclosure.

In another embodiment, the present disclosure (depicted in FIG. 2) may be an energy-storage apparatus 50 for providing energy to an electrical load. Such an apparatus 50 comprises at least one ultra-capacitor 30 having a positive terminal 32 and a negative terminal 34. The positive and negative terminals 32, 34 being configured to be connected to the electrical load. For example, the positive and negative terminals 32, 34 may be in electrical communication with load terminals 16, 18.

Figure 3:
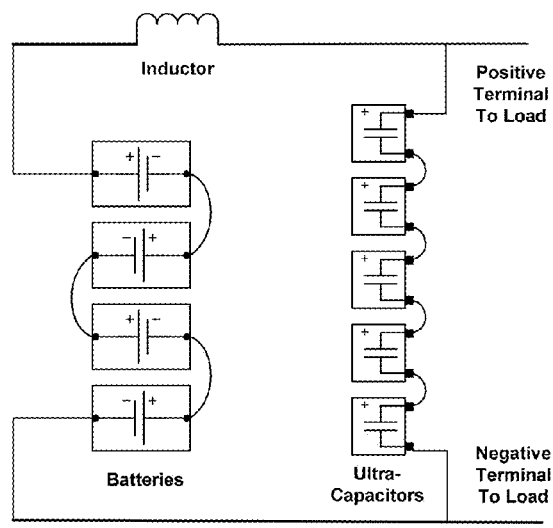
FIG. 3 is a circuit diagram of an energy storage apparatus according to another embodiment of the present disclosure, having multiple batteries and multiple ultra-capacitors.
Figure 4B:
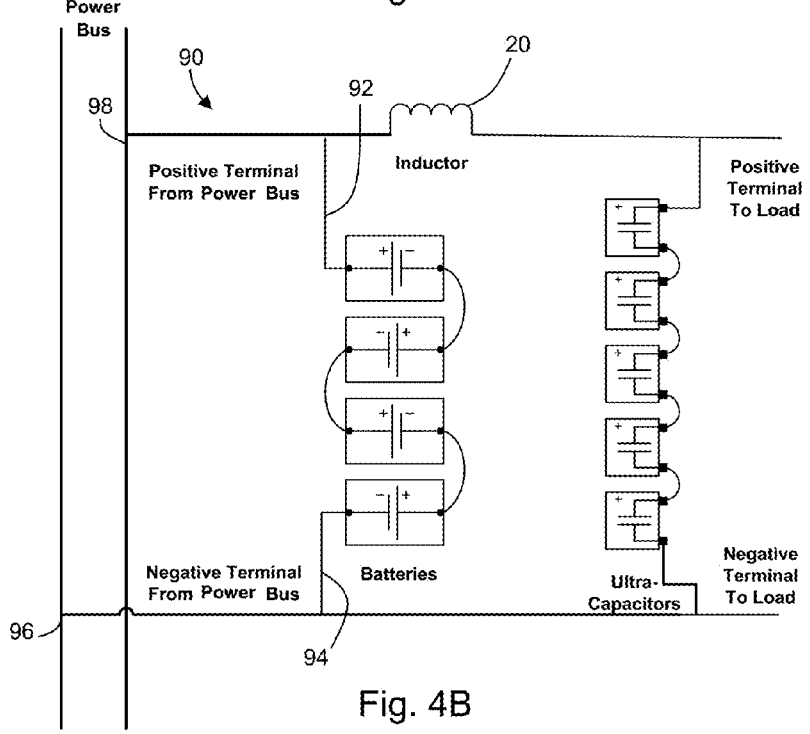
FIG. 4B is a circuit diagram of an embodiment of the energy storage apparatus configured to be connected to a power bus.
Figure 5:
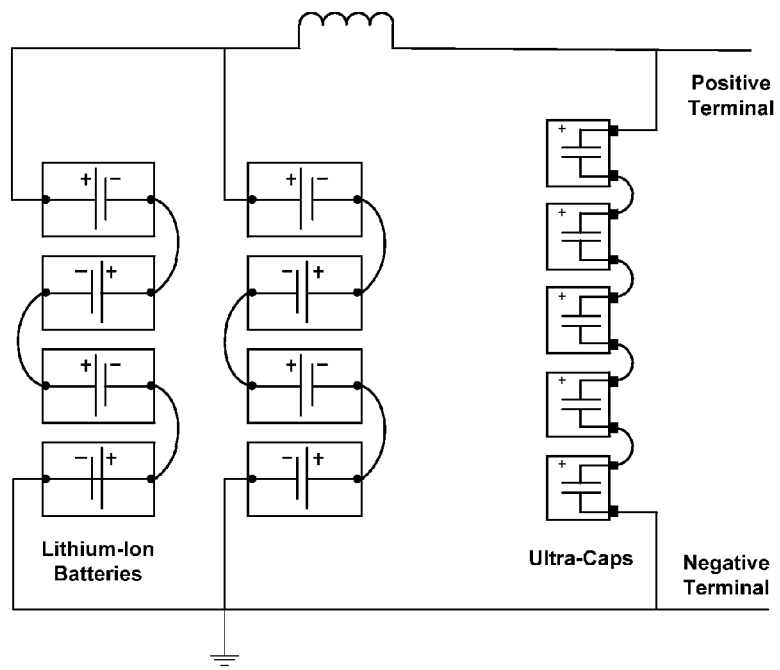
FIG. 5 is a circuit diagram of another embodiment of an energy storage apparatus according to the present disclosure.
Figure 6:
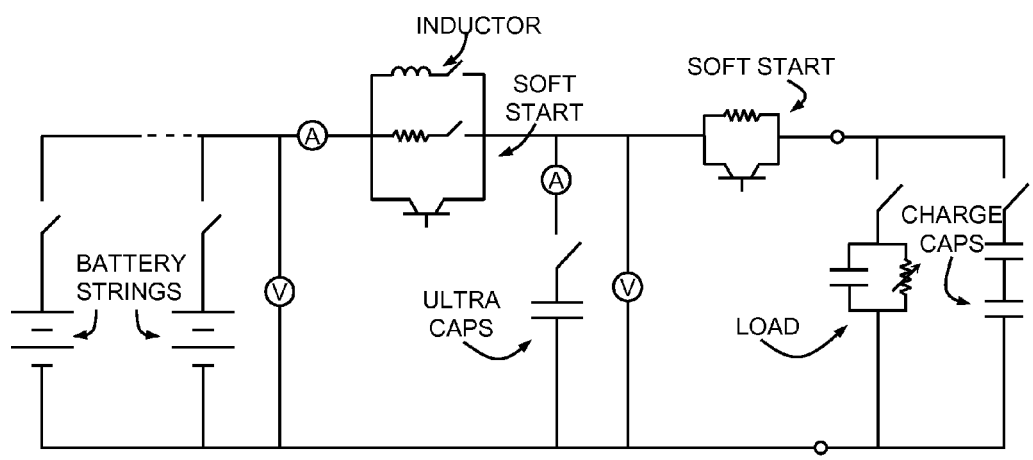
FIG. 6 is a circuit diagram of another embodiment of an energy storage apparatus according to the present disclosure.
Figure 7:
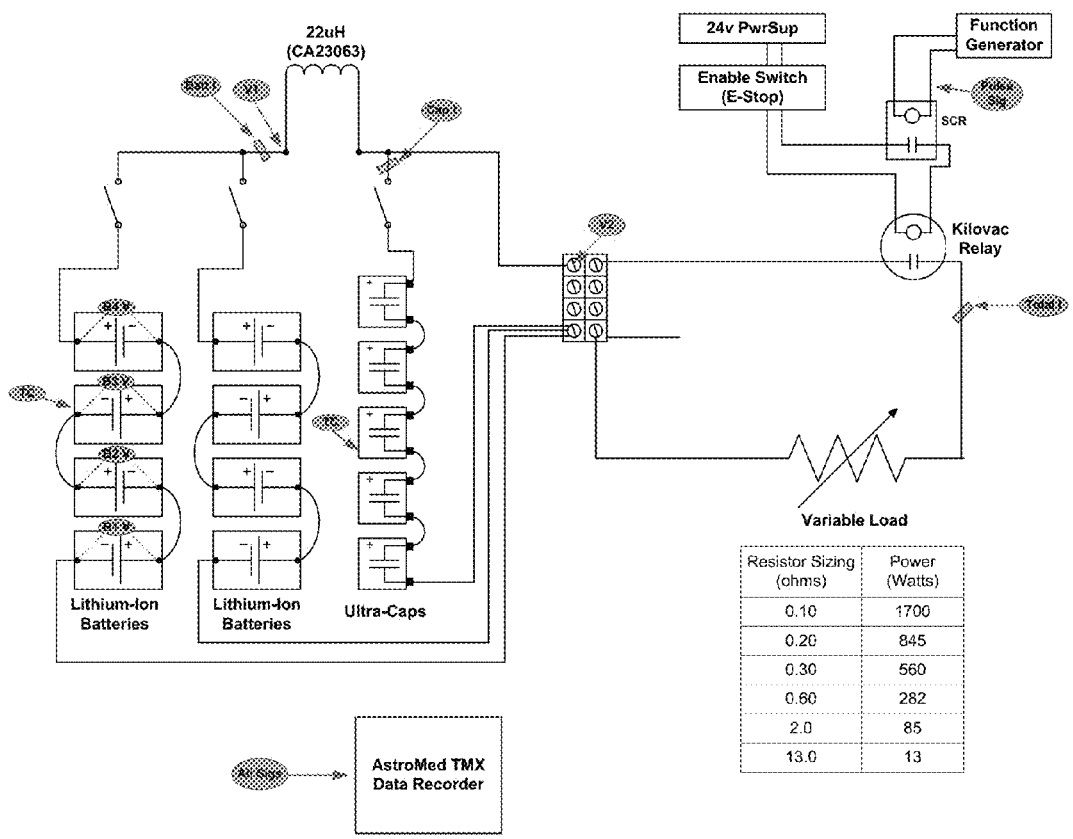
FIG. 7 is a circuit diagram of an energy storage apparatus shown of the present disclosure connected to a testing apparatus.

The apparatus 50 further comprises a battery 60 having a battery positive lead 62 and a battery negative lead 64. The battery negative lead 64 is coupled to the negative terminal 34 of the ultra-capacitor 30. The apparatus 50 may comprise more than one battery 60 connected in series with one another, to provide higher voltage, and/or in parallel with one another, to provide higher peak current draw. FIGS. 3 and 4B depict embodiments wherein multiple battery cells are connected in series. FIG. 5 depicts an embodiment of an energy-storage apparatus wherein a four-cell string of batteries (i.e., in series) is connected in parallel with another four-cell strong of batteries.

An inductor 20 is provided having a first lead 24 coupled to the positive terminal 32 of the at least one ultra-capacitor 30. A second lead 22 of the inductor 20 is coupled to the battery positive lead 62 of the battery 60. The inductor 20 has a low-permeability core material. In some embodiments, the core of the inductor 20 is made from steel, aluminum, or platinum. The inductor 20 may further comprise one or more thermal pads disposed between the core and the windings to aid in heat transfer.

Figure 4A:
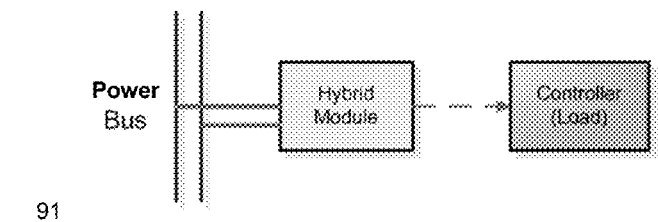
FIG. 4A is a diagram of an energy storage apparatus configured to be connected to a power bus.

Devices of the present disclosure may be adapted to accept power from a power bus (see, for example, FIG. 4A). In the embodiment of an bus-attached energy-storage apparatus 90 depicted in FIG. 4B, battery positive lead 92 is connected to a bus positive terminal 98 of a power bus 91 and battery negative lead 94 is connected to a bus negative terminal 96 of the power bus 91. In this way, the apparatus 90 may act as an autonomous energy pack (e.g., a regen buffer to a central bus line) or can be used as a low power bus booster pack (providing high power to a load without having to upgrade a low power bus rail). Such a power bus-attached embodiment may include a clamping circuit between the apparatus 90 and the power bus 91. In this way, power from the apparatus 90 would not be output back onto the bus.

Ultra-Capacitors

The ultra-capacitor(s) may preferably be capable of supplying a majority of load current demands and regen current capability. The capacitance rating of the selected ultra-capacitor will determine current supply capability. In this way, the higher the capacitance, the higher the energy and therefore the larger the current load the ultra-capacitor can take in the system. The higher capacitance ultra-capacitors may advantageously be paired with low power/higher energy battery cells or matched with a higher current load duty cycle (vice-versa with lower capacitance cells). Ultra-capacitor selection may be based off of overall system sizing with regard for weight.

Batteries

The battery(ies) may preferably be capable of supplying charge current for the ultra-capacitor(s) as well as providing secondary load current. Additionally, the battery should be capable of maintaining itself without violating safe cell charge/discharge practices.

Inductor

The inductor size is tuned for each application and done in view of the whole system because the inductor is the passive control element. The inductor selection is first based on selectivity, which is a ratio between the inductance and capacitance of a filter system. This selectivity, with some augmentation for the peak currents and voltage seen by the inductor, drive the inductor sizing. Based on the inductor sizing, the design is then driven to make the inductor work without any ill-effects (current saturation) while being volume efficient, all while being capable of use in a high-power environment. To handle such high power applications (e.g., in excess of 100 A), the low permeability-core inductor reduces concerns related to inductor saturation. Additional thermal considerations and winding size considerations are discussed above.

Exemplary Embodiments

Figure 13:
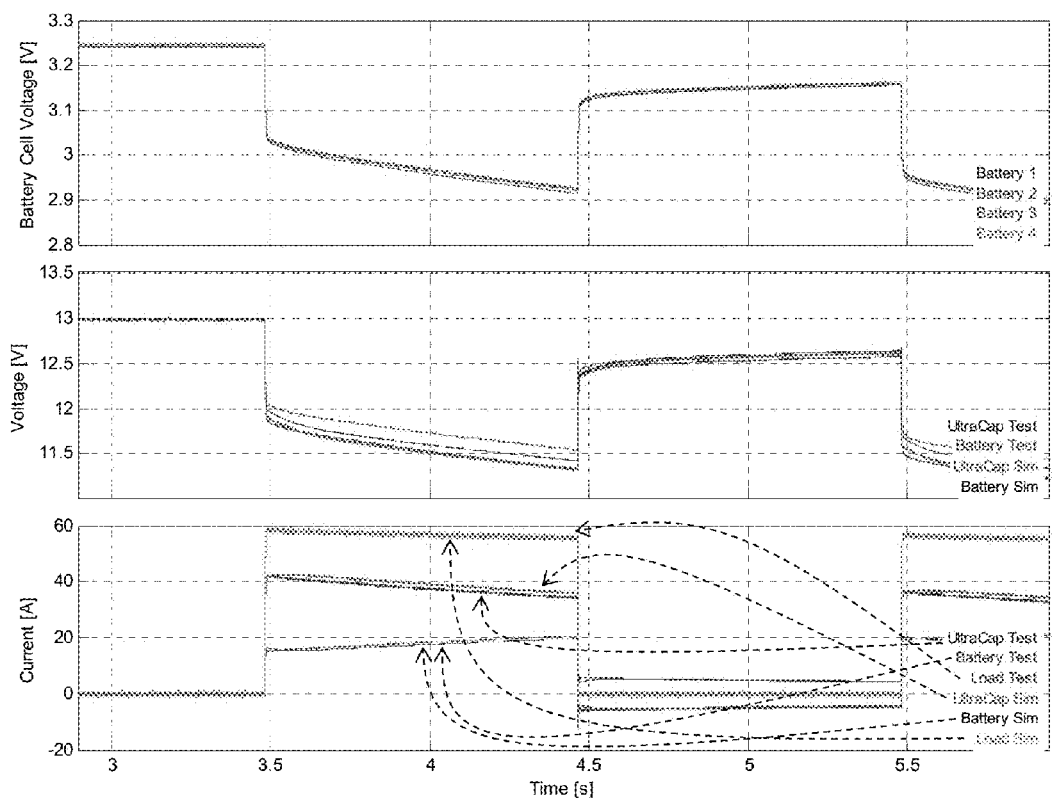
FIG. 13 is a set of graphs showing the response of a 12 VDC test system and comparing the test system to a modeled system.

The functionality of the passive hybridization scheme was demonstrated in the model and using a low-voltage (12 VDC) test circuit. Through this testing, the desired results were demonstrated: the ultra-capacitor supplied a large portion of the initial current demand, the current output capability increased with the size of the ultra-capacitor, as current was supplied from the ultra-capacitor, the available voltage decreased, which led to decreases in the contribution to total output current from the ultra-capacitor. A library of cells (both battery and ultra-capacitor) was developed for a mathematical model and for use in simulating the presently disclosed passive hybridization techniques. The testing library was developed using low-voltage (12 VDC) test data. Based on the testing, the model was considered to be correlated (see, e.g., FIG. 13).

Figure 14:
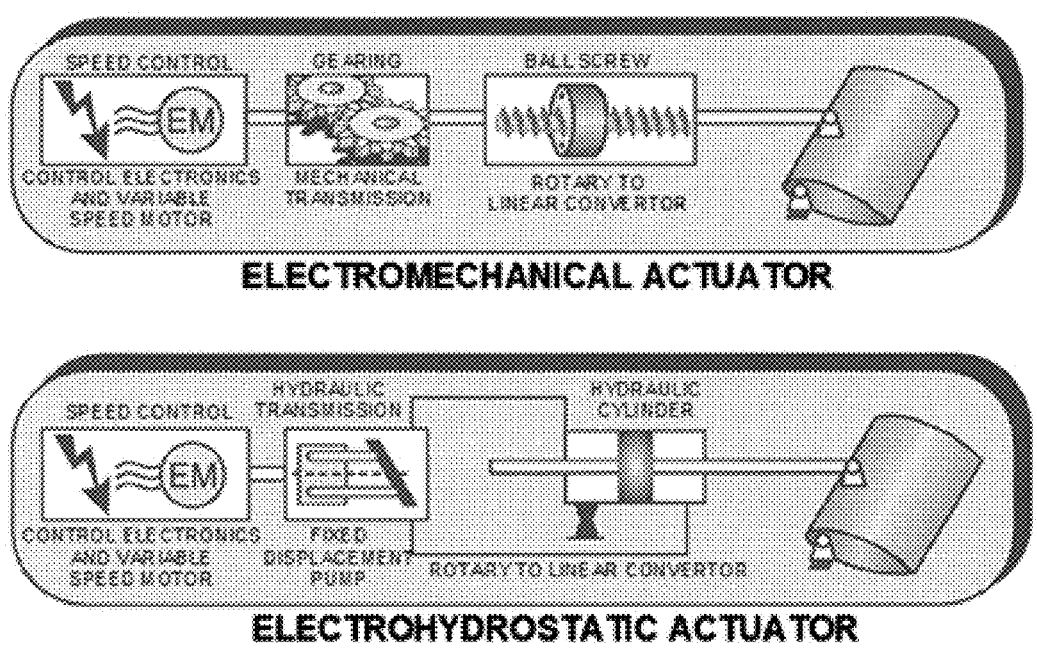
FIG. 14 is a block diagram depicting exemplary applications for a high-voltage apparatus of the present disclosure.

FIG. 14 depicts two typical high-current applications—an electromechanical actuator and an electrohydrostatic actuator—having loads that can range anywhere within the described application space. Systems of the present disclosure are suitable for use in such applications as power sources connected to what is noted in the figures as the "control electronics and variable speed motor."

A 300 VDC passive hybridization system was built to demonstrate the functionality of the disclosed apparatus in a high-voltage application, such as, for example, an electromechanical actuator or an electrohydrostatic actuator, shown in FIG. 14, and other applications within the described application spaces. The 300 VDC demonstration system was also used to show the extreme discharge and regen capabilities of the presently disclosed techniques.

Figure 15:
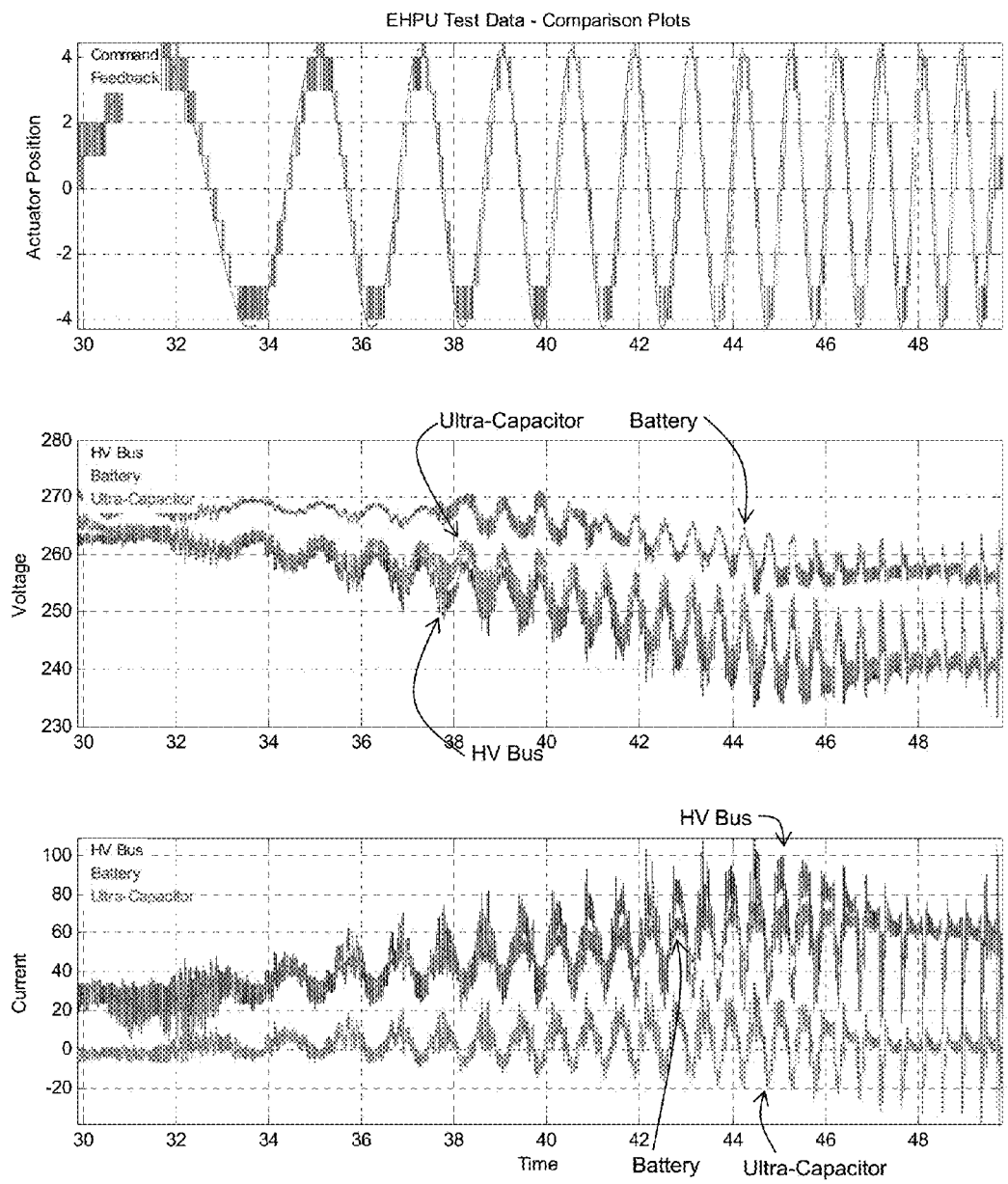
FIG. 15 is a set of graphs depicting the swept frequency response of a 300 VDC exemplary system.
Figure 16:
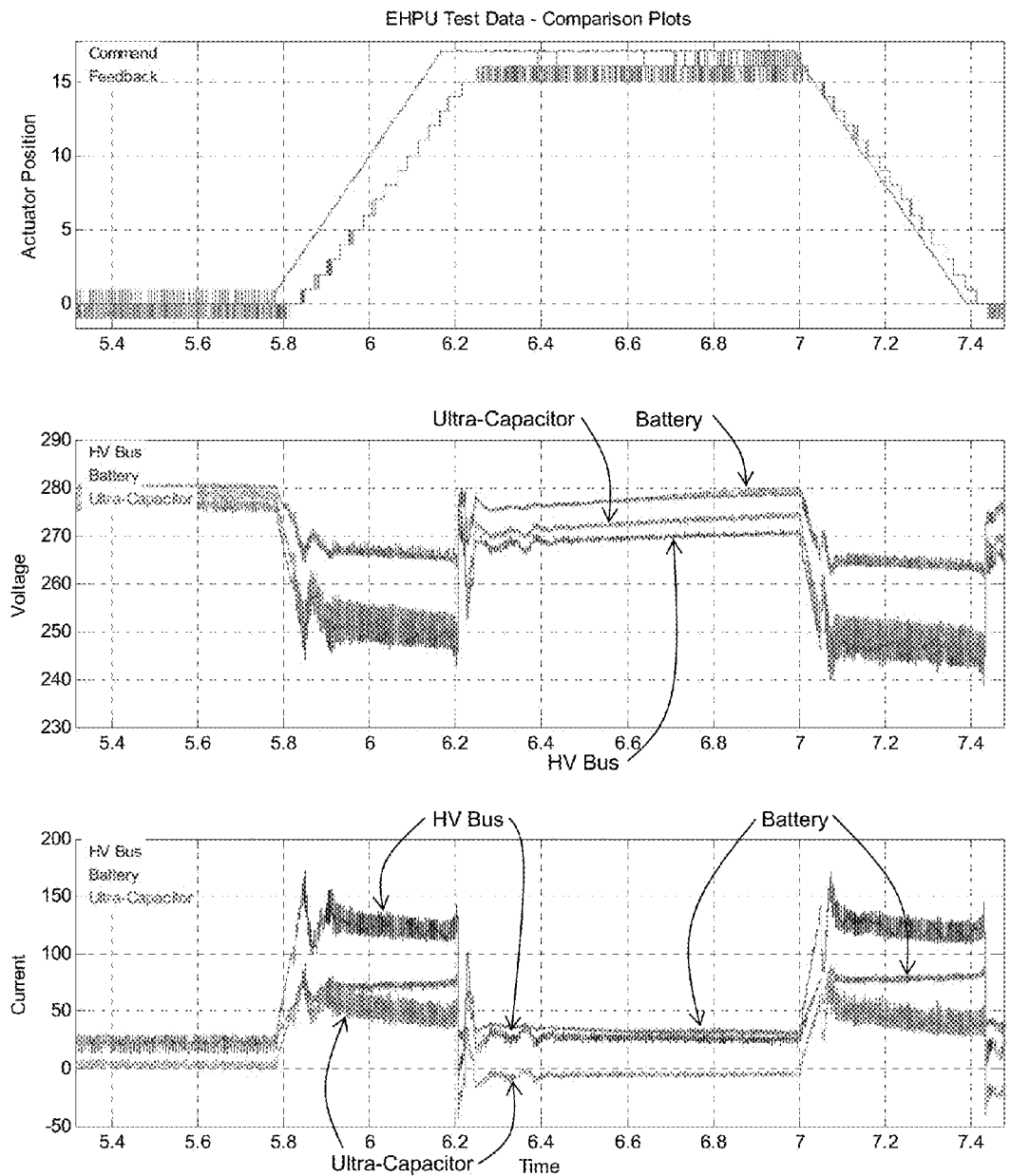
FIG. 16 is a set of graphs depicting the response of the 300 VDC exemplary system to a portion of the conducted duty cycle.
Figure 17:
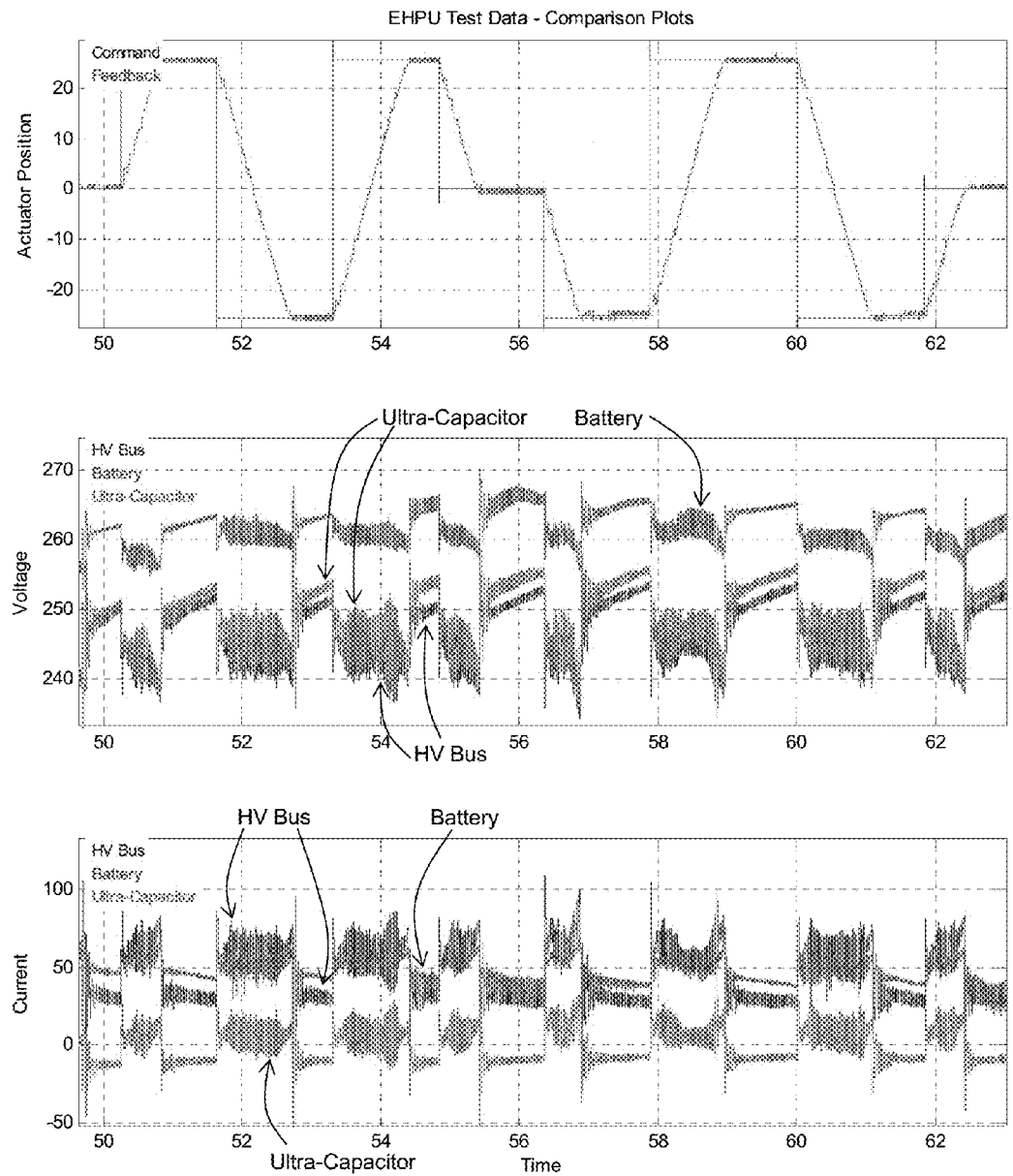
FIG. 17 is a set of graphs depicting the response of the 300 VDC exemplary system to another portion of the conducted duty cycle.
Figure 18:
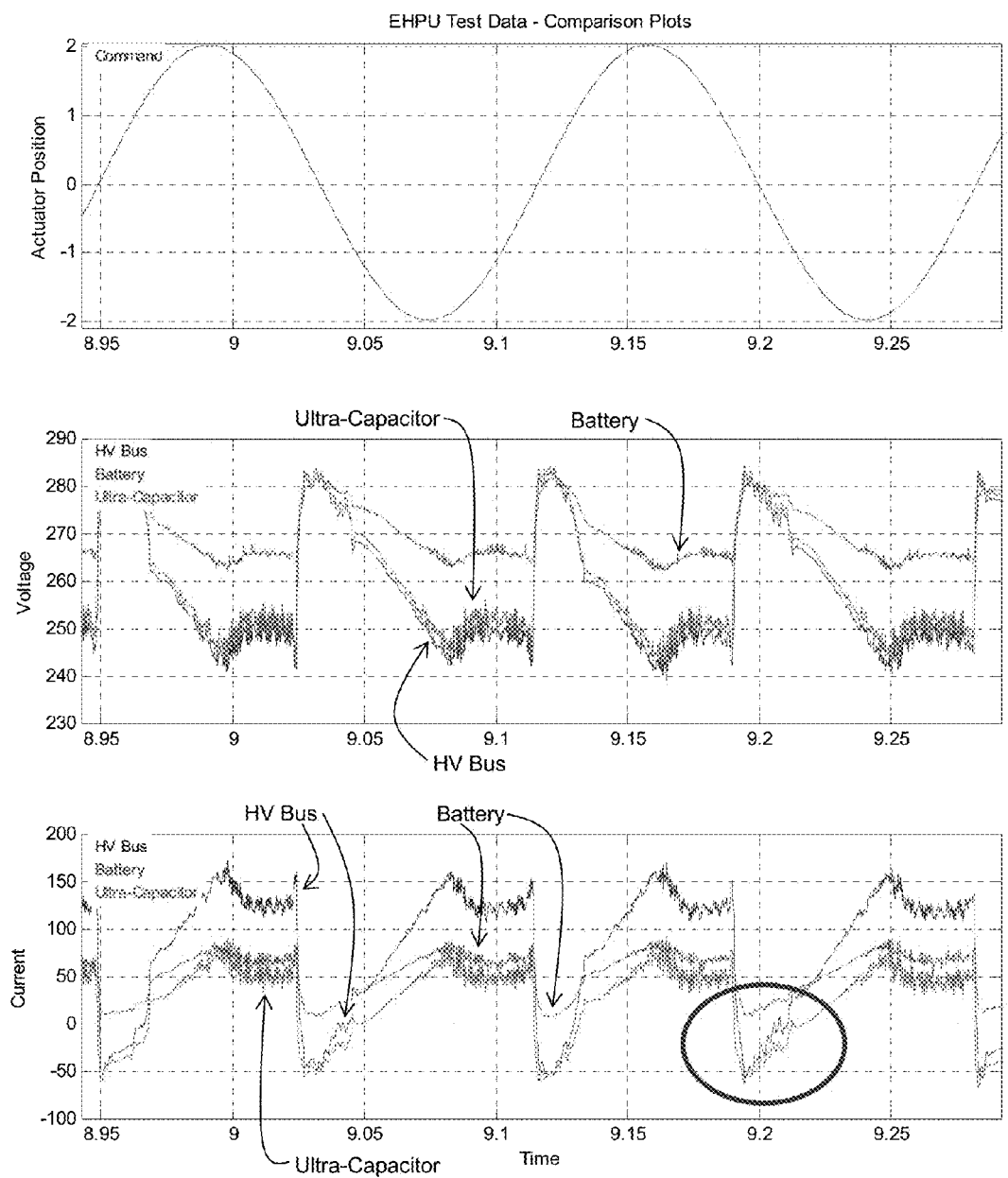
FIG. 18 is a set of graphs depicting the 6 Hz frequency response of the 300 VDC exemplary system.

FIG. 15 depicts the swept frequency response of the 300 VDC demonstration system; FIGS. 16 and 17 depict the response of the system to portions of the duty cycle; and FIG. 18 depicts the 6 Hz frequency response of the system. It can be seen that the system maintains an acceptable level of voltage during pulsed discharge. The battery output (voltage/current) is kept to a more steady level, which is advantageous for battery selection. The ultra-capacitor is taking transient current demand. In the case of the 6 Hz response, it is noted that the ultra-capacitor is taking all of the regen current (see circled portion).

Figure 12:
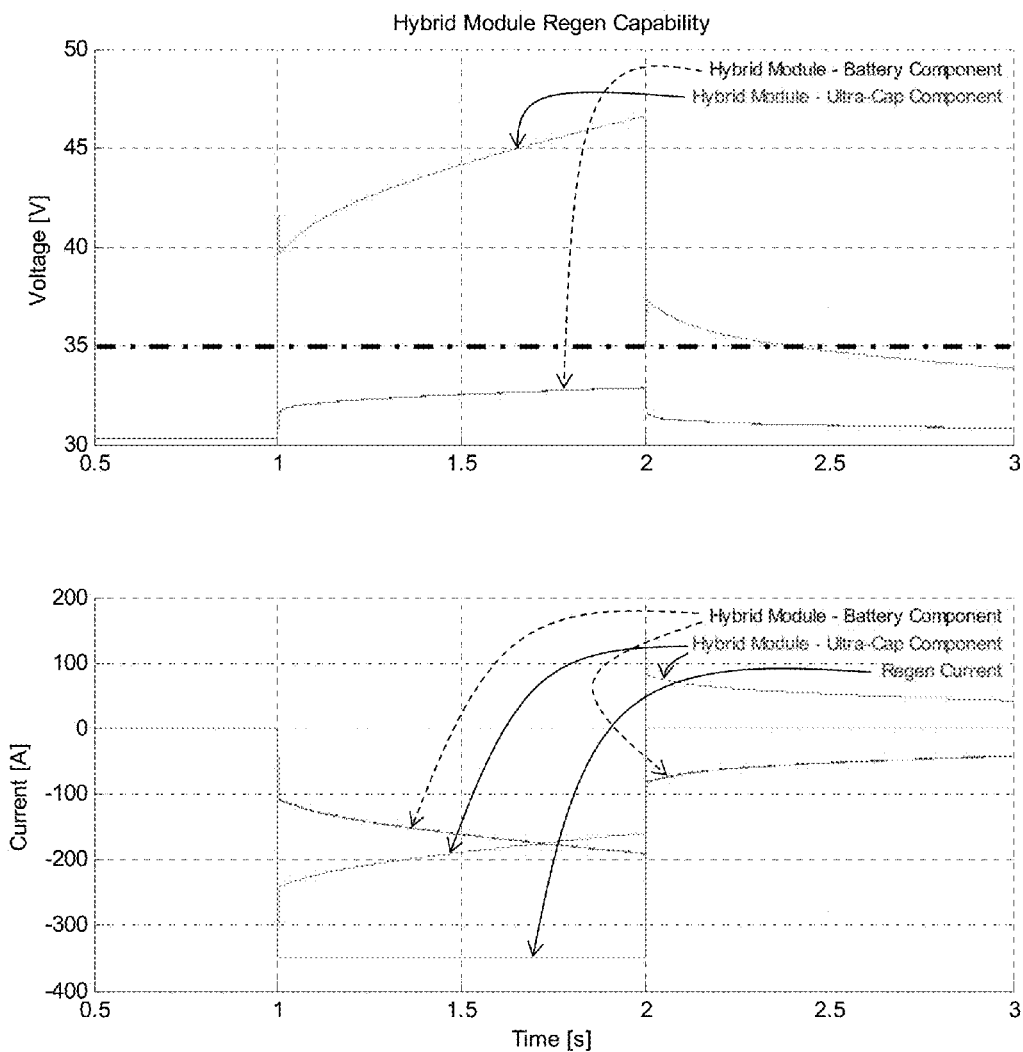
FIG. 12 is a set of graphs showing the regen characteristics of components of an embodiment of a hybrid module according to the present disclosure.

Through this testing of a hybrid module, the concept of load sharing between battery and ultra-capacitor component was validated and used for model correlation. In simulation, the hybrid module was capable of accepting 350A of regenerative current in a is pulse (see FIG. 12) and 500A of regenerative current in a 0.1 s pulse. This compares to 180A @ 1 s and 190A @ 0.1 s for the battery-only module.

The present application may be embodied as a method for passive voltage control in a hybrid energy module having at least one battery and at least one ultra-capacitor. Each of the at least one battery and at least one ultra-capacitor having a respective positive terminal and negative terminal. The method comprises the step of providing an inductor connected between positive terminals of the battery and ultra-capacitor, the inductor having a low-permeability-core.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A passively voltage-controlled ultra-capacitor module for an energy storage apparatus, comprising:
   a battery positive terminal configured to be connected to a positive terminal of a rechargeable battery;
   a battery negative terminal configured to be connected to a negative terminal of the rechargeable battery;
   an inductor having a first lead, a second lead, and a low-permeability core, the first lead being in electrical communication with the battery positive terminal;
   at least one ultra-capacitor having a positive lead and a negative lead, the positive lead being in electrical communication with the second lead of the inductor and the negative lead being in electrical communication with the battery negative terminal; and
   a load positive terminal and a load negative terminal, configured such that a load connected to the load terminals is electrically in parallel with the at least one ultra-capacitor.

2. The ultra-capacitor module of claim 1, wherein the core is a thermally conductive material, and the core is configured to dissipate heat from windings of the inductor.

3. The ultra-capacitor module of claim 2, wherein the inductor further comprises one or more thermal pads disposed between the core and the windings to aid in heat transfer.

4. The ultra-capacitor module of claim 1, wherein the core has a permeability of less than $1.2567\lambda 10^{-6}$ H/m.

5. The ultra-capacitor module of claim 4, wherein the core is steel, aluminum, or platinum.

6. The ultra-capacitor module of claim 1, wherein the at least one capacitor comprises two or more ultra-capacitors arranged in series.

7. An energy-storage apparatus for providing energy to, or accepting energy from, an electrical load, comprising:
- at least one ultra-capacitor having a positive terminal and a negative terminal, the positive and negative terminals configured to be connected to the electrical load and arranged such that a connected electrical load is in parallel with the at least one ultra-capacitor;
- an inductor having a low-permeability core, a first lead and a second lead, the first lead being coupled to the positive terminal of the at least one ultra-capacitor; and
- at least one battery having a battery positive lead and a battery negative lead, the battery positive lead being coupled to the second lead of the inductor, and the battery negative lead being coupled to the negative terminal of the at least one ultra-capacitor.

8. The energy-storage apparatus of claim 7, wherein the core is a thermally conductive material, and the core is configured to dissipate heat from windings of the inductor.

9. The energy-storage apparatus of claim 8, wherein the inductor further comprises one or more thermal pads disposed between the core and the windings to aid in heat transfer.

10. The energy-storage apparatus of claim 7, wherein the core has a permeability of less than $1.2567\lambda 10^{-6}$ H/m.

11. The energy-storage apparatus of claim 10, wherein the core is steel, aluminum, or platinum.

12. The energy-storage apparatus of claim 7, wherein the at least one capacitor comprises two or more ultra-capacitors arranged in series.

13. The energy-storage apparatus of claim 7, wherein the at least one battery comprises two or more batteries arranged in series and/or parallel.

14. A bus-attached energy-storage apparatus for buffering power provided to an electrical load, the apparatus comprising:
- a power bus having a bus positive terminal and a bus negative terminal;
- at least one battery having a battery positive lead coupled to the bus positive terminal and a battery negative lead coupled to the bus negative terminal;
- an inductor having a low-permeability core, a first lead, and a second lead coupled to the battery positive lead, and
- at least one ultra-capacitor having a positive terminal connected to the first lead of the inductor and a negative terminal connected to the battery negative terminal, the positive and negative terminals configured to be connected to the electrical load and arranged such that a connected electrical load is in parallel with the at least one ultra-capacitor.

15. The bus-attached energy-storage apparatus of claim 14, wherein the core is a thermally conductive material, and the core is configured to dissipate heat from windings of the inductor.

16. The bus-attached energy-storage apparatus of claim 15, wherein the inductor further comprises one or more thermal pads disposed between the core and the windings to aid in heat transfer.

17. The bus-attached energy-storage apparatus of claim 14, wherein the core has a permeability of less than $1.2567 \times 10^{-6}$ H/m.

* * * * *